May 5, 1970  W. H. BENNETT  3,510,713
METHOD OF AND APPARATUS FOR PRODUCING A HIGHLY
CONCENTRATED BEAM OF ELECTRONS
Filed July 19, 1966  3 Sheets-Sheet 1
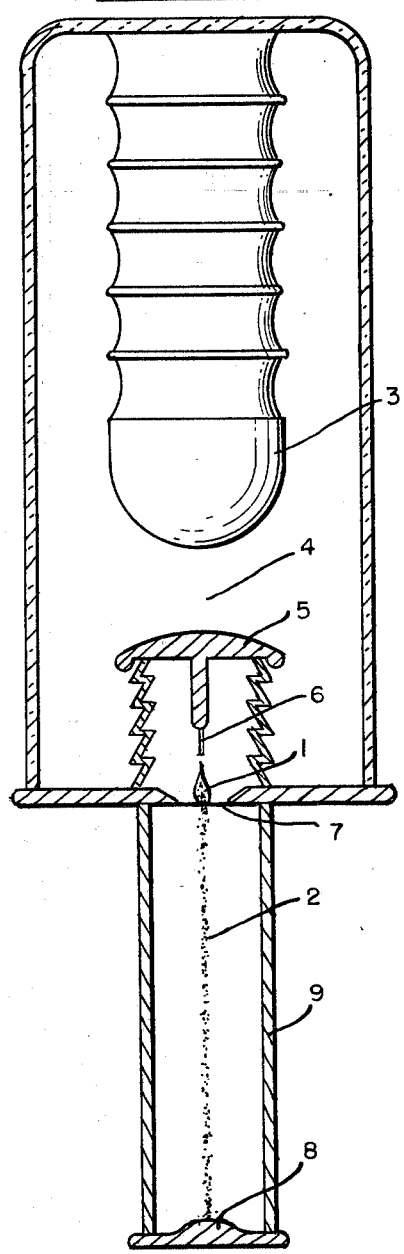
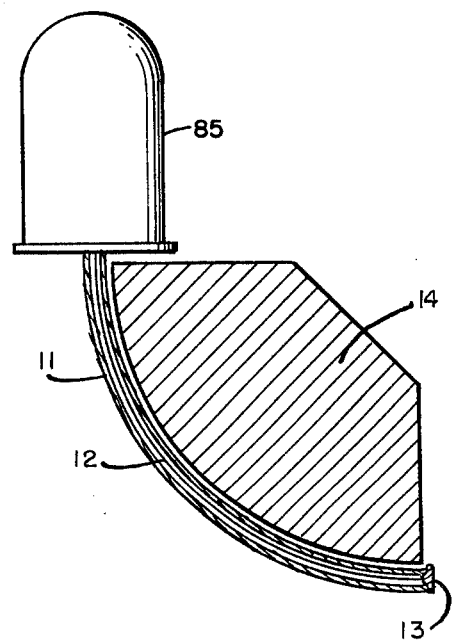
INVENTOR
Willard H. Bennett
BY Moore and Hall
ATTORNEYS INVENTOR
Willard H. Bennett

BY

ATTORNEYS

United States Patent Office 3,510,713
Patented May 5, 1970

3,510,713
METHOD OF AND APPARATUS FOR PRODUCING A HIGHLY CONCENTRATED BEAM OF ELECTRONS
Willard H. Bennett, 5500 North Hills Drive, Raleigh, N.C. 27609
Filed July 19, 1966, Ser. No. 569,549
Int. Cl. H01j 35/00
U.S. Cl. 313—57    17 Claims

ABSTRACT OF THE DISCLOSURE

The invention, hereinafter, described in greater detail, relates to means for and a method of concentrating a beam of electrons. The beam is generated in any suitable manner, although preferably by electron discharging apparatus, and is directed into and in alignment with a column of ionized gas. The gas in said column having been ionized prior to the time that the beam is initiated, causes the beam to be pinched and thereby concentrated.

---

Subsidiary features of the invention include details of the pinching process and apparatus. Moreover, the invention is useful in a wide variety of fields where a concentrated beam of electrons is required such as, for example, in welding or in production of X-rays.

This invention relates to a method of and apparatus for producing a highly concentrated electron beam. There are many uses for a highly concentrated beam of electrons, such as, for example, producing X-rays, and in electron beam welding. The primary object of this invention is to provide an improved way of producing a highly concentrated beam of electrons.

Other objects and advantages of the invention will appear as this description proceeds.

In carrying out the invention, I employ suitable means for producing an electron beam. I than pinch the beam with an ionized column to increase the concentration of the beam.

This invention pertains to the production and utilization of beams of very high energy electrons which are self-focused. I have previously published regarding such beams in Proc. 2nd U.N. Geneva Conference on Peaceful Uses of Atomic Energy, vol. 32, pp. 451–456, 1959 (Pergamon Press) and in U.S. Pats. Nos. 2,905,842; 2,925,505; and 2,970,273. In that previous work, circular beams were produced and utilized.

In this invention, use is made of a machine which can produce very high intensity pulses of high energy electrons. One example of such a machine is the one recently developed by the Physics International Company of Berkeley, Calif. With this machine, currents of about 30,000 amperes of about 3,500,000-volt electrons are produced in 30 nanosecond pulses. That kind of machine generally produces electron pulses which spread out drastically from the field current emitting cathode due to the great amount of space charge and are difficult to guide or control.

In this invention such a machine is connected to a tube, (called the pinch tube) within which a magnetically self-focusing (or "pinched") discharge is produced along the axis of the discharge tube of the machine and in extension of that discharge tube so that the machine is fired and its intense pulse of electrons is produced just when the pinched discharge has drawn down almost to its minimum diameter. One purpose of the pinched discharge is to provide a column of ionized gas into which the high energy electron can flow, pushing aside some of the electrons in the pinch and so overcoming the spacecharge of the intense electron pulse. A second purpose of the pinched discharge is to provide a column whose self-magnetic field not only confines the column but acts equally well on the pulse of high energy electrons, confining it also.

Such a beam of electrons at energies well above 500,000 volts, the rest-energy of an electron, will pinch down well before the space charge of the beam has become neutralized and as neutralization proceeds, the beam pinches down much more, concentrating the energy on the target electrode struck by the pulse into a very small area. One effect of such excessive concentration is the hyper-penetration effect, first noted by Schwartz, Jour. Appl. Physics, vol 35, pp. 2020–2029, July 1964. Another effect is the production of matter whose temperature is increased so high that not only are the atoms completely ionized and stripped but also the nuclei are at least in part fused— thus simulating the matter in the interior of stars.

The pinch tube need not be straight but instead can be curved around bends or in a serpentine manner. The pinched discharge forms by collapsing towards the middle of the tube, and the self-magnetic field of the pinched discharge guides the very high energy electron beam inside of the pinch discharge along the bent path. This permits shielding the target from the radiations which come from the machine and its discharge gap.

There are other applications which are obvious to those skilled in the art and still others which are not so obvious and will be discussed in later disclosures.

In the drawings:

FIG. 1 illustrates the basic tube structure for carrying out the invention.

FIG. 2 illustrates an alternate arrangement for the ionizing tube.

Figure 3:
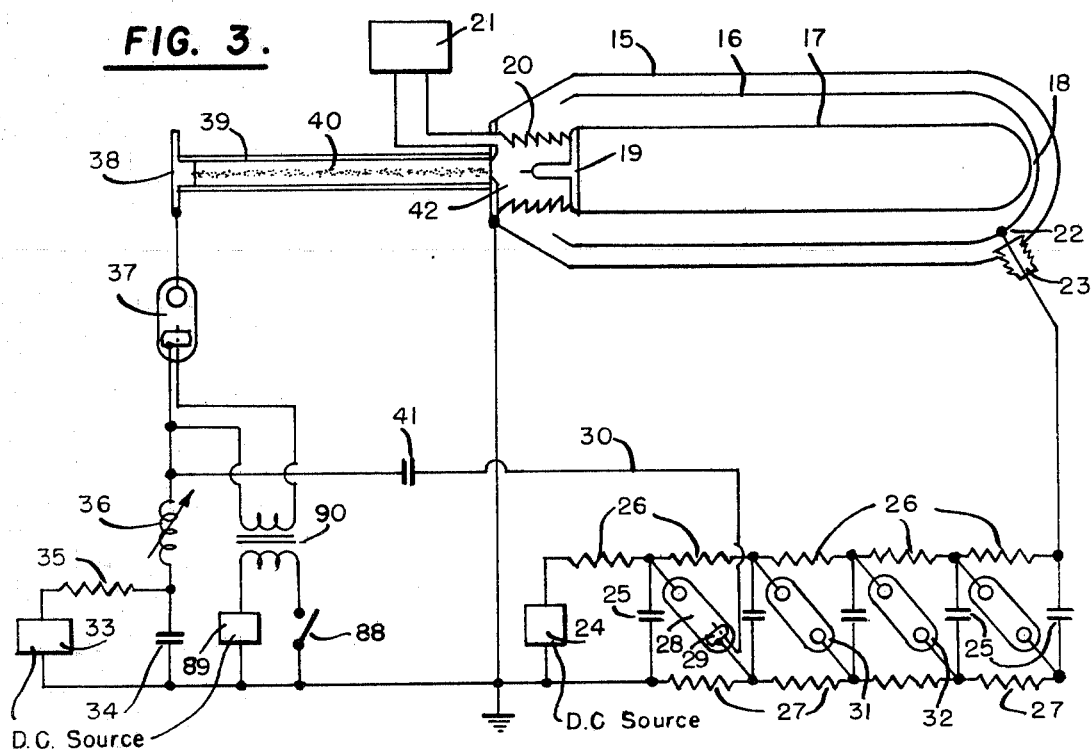
FIG. 3 illustrates another form of the tube structure and includes a schematic diagram of an energizing circuit therefor.

In recent years, methods have been developed for producing pulses of electrons with energies of the order of 2 to 10 million electron-volts at currents of the order of 20,000 to 300,000 amperes and at pulse lengths of the order of 0.00000002 to 0.00000005 second, that is 20 to 50 nanoseconds.

One method for producing such pulses is described by S. Graybill, H. Lackner, and S. V. Nablo in the Proceedings of the Electron and Laser Beam Symposium, pp. 175–189 edited by A. B. El-Kareh, held at Pennsylvania State University Mar. 31–Apr. 2, 1965, in an article entitled, "Megavolt Pulsed Electron Beam Techniques."

Such pulses as those blow up, that is, spread out drastically, due to the mutual electrostatic repulsion of the electrons unless means are used for holding the beams together. Only partial success is attained by projecting the pulses into a gas, thus ionizing the gas, and allowing the positive ions so produced to neutralize the space charge as discussed by S. E. Graybill and S. V. Nablo in Applied Physics Letters, vol. 8, No. 1, pp. 18–20, Jan. 1, 1966, in an article entitled, "Observations of Magnetically Self-Focusing Electron Streams."

This invention involves the production of a linear pinched discharge opposite to and in line with the high voltage discharge gap in order that the electron beam 1, produced in the gap enters the end of the linear pinched discharge 2, as shown in FIG. 1, which illustrates one form of this invention. The high voltage is stored on the electrode 3, by the well-known methods used in Van de Graaff electrostatic generators. When the electrode has attained a high voltage, a high pressure spark-over occurs in the gap at 4, bringing electrode 5 to a high voltage and causing an electron discharge to occur from the electrode 6 toward the grounded electrode 7.

Coordinated with this discharge, another discharge is caused to occur between the electrode 8 and the grounded electrode 7 through gas in the tube 9, which is held at a pressure of the order of 0.05 to 10 torr. This latter discharge which will be referred to as the pinch draws down to an ionized column 2 in the middle of the tube 9.

The high voltage discharge 1 is caused to occur while the electrode 8 is positive with respect to ground in order that the self-magnetic field of the current in the pinch will gather in and focus the high voltage electron beam in the discharge 1, when it enters the end of the pinch.

As the high voltage electrons enter the pinch, they push outwards electrically upon the more slowly moving electrons in the pinch, that is, they push them radially outwards, thus leaving behind an excess of positive ions over pinch electrons, which excess tends to neutralize the space charge due to the high voltage electrons which are entering.

As the high voltage electrons enter the pinch, they also comprise an increasing electron current and this induces electric fields which tend to produce electron currents in the oposite direction in the vicinity of the high voltage beam. The component of velocity in the reverse direction given to the pinch electrons by the induced electric fields produces a force upon these pinch electrons which is radially outwards due to the interaction of that velocity component with the self-magnetic field of the injected high voltage electron beam. This radially outwards magnetic force is in addition to the outwards electric force due to excess negative charge, mentioned above. I have described this pinch effect in Physical Review, vol. 90, p. 398, 1953, in a paper entitled, "Magnetically Self-Focusing Discharges."

The displacement of pinch electrons radially outwards allows the self-magnetic field of the high voltage beam to pinch that high voltage beam down further and to make this beam deliver energy upon the target electrode 8—a very much greater concentration of power than would have been possible with the divergent beam at 1, if the pinch had not been used.

The self-magnetic field of the pinch also acts as a guide to deliver the concentrated high voltage beam to the target at the middle of the end of the pinch which is at the target electrode 8.

If the pinch is produced in a curved tube like 11, in FIG. 2, instead of the straight tube as shown in FIG. 1, the pinch forms along the middle of the curved tube at 12, and the self-magnetic field of the pinch guides the high voltage beam along that curved path to the target 13. Radiation shielding can be interposed at 14 between the high-voltage machine 85, and the target 13 in order to be able to use only the radiations produced at 13 by the impact of the high voltage electrons, uncontaminated by radiations produced at the high voltage machine by stray currents.

One example of a machine for producing intense pulses of relativistic electrons is shown in FIG. 3. Inside of a tank 15, there are suspended two coaxial cylindrical electrodes 16 and 17. The rounded caps on 16 and 17 are held much closer to each other, at the gap 18, than the distances elsewhere between 16, 17 and 18.

At the other end of the inner electrode 17 is a high voltage electrode 19, which is supported on an insulating bushing 20. All of the tank except the inside of the bushing, is filled with an insulator such as oil, or sulfur hexafluoride or other insulating fluid or gas. The inside of the bushing is kept evacuated to pressures less than 0.1 micron by means of the vacuum pumps 21.

The intermediate electrode 16 is charged to a high voltage through a wire connected at 22 which comes through the wall through the bushing 23. This wire is connected to the source of high voltage shown below the tank in the figure and which may be constructed in any of many ways familiar to those skilled in the art. One way is to use the Marx circuit shown.

A D.C. supply of potential of the order of 50,000 or 100,000 volts, charges a bank of condensers 25 in parallel through high resistances 26 and 27 which are preferably more than 1000 ohms each. Shown at 28, is a triggered gap, which is a spark gap in which one of the electrodes has a hole in it along the axis of the two electrodes. Inside of the hole is held a wire the end of which at 29 is near the opening towards the other electrode. This wire is insulated so that when a high voltage is suddenly applied to it through the wire 30, a small spark will jump from the end 29 to the surrounding electrode. This causes a spark-over of the gap and suddenly connects the high voltage end of the first condenser to the low voltage end of the second condenser and applies a voltage across the next spark gap at 31 which is much greater than the breakdown voltage of that gap. This over-volts the next spark gap at 32 even more and so on, sparking over the next of the spark gaps and suddenly connects all of the condensers 25 in series applying the total voltage to the intermediate electrode 16. Instead of the triggered gap described in the above, a thyratron or any other of the high voltage valves familiar in the art may be used.

Instead of the above-described form of the triggered Marx circuit, any one of a variety of other high voltage generators may be used.

Referring again to FIG. 3, one of several methods is shown for producing the pinched discharge and coordinating the timing of this discharge with the discharge of the intense electron discharge in the high voltage machine. In this example, a D.C. high voltage supply of the order of 10,000 to 100,000 volts, at 33 charges the condenser 34 through a high resistance 35. The condenser is connected through an adjustable inductance 36 to a triggered gap, or thyratron or equivalent at 37. In the illustration, the gap is triggered by closing the switch 88 and causing a sudden current from the D.C. supply at 89 to pass through the transformer 40. This suddenly connects the high voltage from the condenser 34 to the pinch anode 38 causing the gas in the pinch tube 39 to ionize and pinch to form a dense ionized channel at 40. Any gas may be used in the pinch tube and one which behaves quite well is argon. A good pressure of argon to use is in the order of 0.2 torr.

At the same time that the voltage from the condenser 34 is connected to the pinch anode, a voltage pulse is transmitted through the condenser 41 to the trigger of the high voltage circuit at 28. By adjusting the inductance at 36, the electron discharge at the high voltage across the gap at 42 can be made to occur just as the pinch discharge 40 has drawn down to a radius of the order of preferably less than one centimeter.

Figure 4:
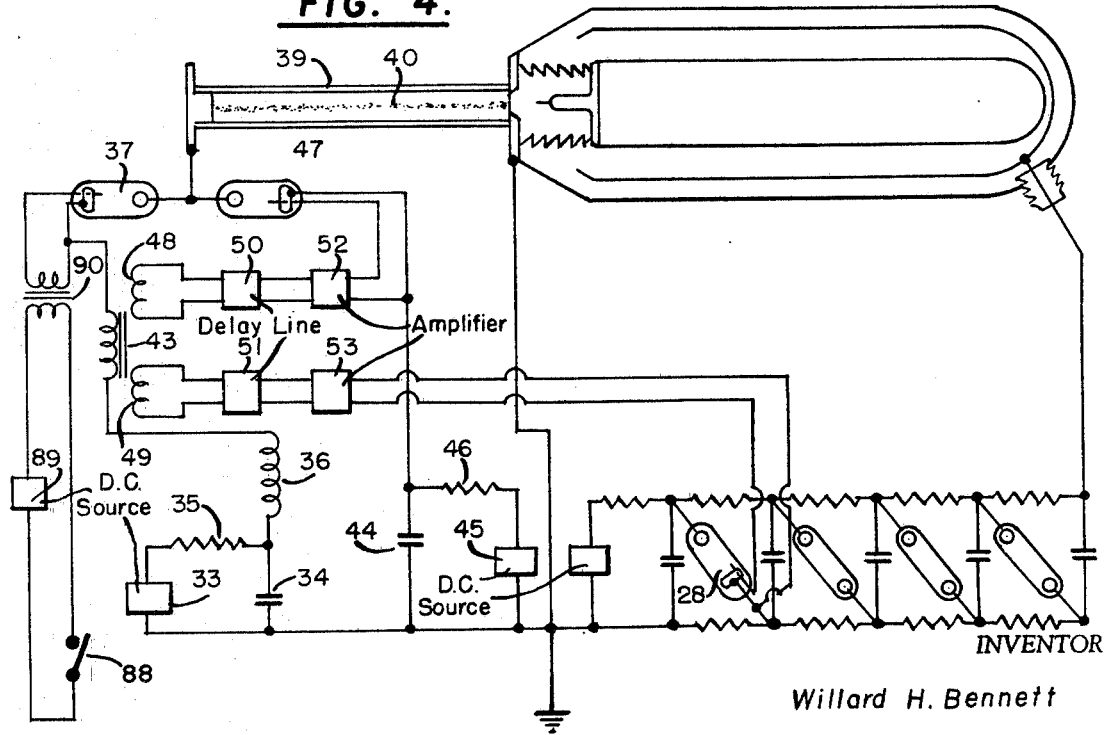
FIG. 4 is similar to FIG. 3 except for certain improvements in the electric circuit.

A more elaborate and more precisely timable form of the equipment is illustrated in FIG. 4, in which the machine for producing the intense electron beam is similar to that shown in FIG. 3, but in which provision is made for preionizing the gas in the pinch tube before the pinch and the intense electron pulse are produced.

In FIG. 4, a power supply 33 is used for charging a condenser 34 through a resistor 35. The condenser is connected through an inductance 36 and a transformer 43 to a triggered gap or thyratron or other high-voltage valve 37. The device at 37 is triggered by closing the switch 88, which connects the high voltage from the power supply 89 to the transformer 90.

The magnitude of the inductance 36 is selected to slow down the discharge in the pinch tube 39 enough to produce ionization throughout the tube but not to pinch down the discharge within less than about 10 to 100 microseconds if at all. This is called a preionization and assists in readying the conditions inside of the pinch tube 39, so that when the condenser 44 is connected across the tube, a well-formed pinch will form promptly, that is, within less than about 5 microseconds.

The power supply 45 charges the condenser 44 through the resistor 46. The condenser is connected to the triggered gap or other valve 47 to apply high voltage in a steeper pulse which causes the gas in 39 to ionize and pinch down to an ionized column 40.

The transformer 43 has two secondary windings 48 and 49. The output from winding 48 is connected through a delay line 50 to the amplifier 52, which is connected to the triggering device 47. The other winding 49 is connected through a delay line 51 to an amplifier 53, which is connected to the triggering device 28, which fires the high energy machine.

The delay in either 50, or 51, is set so that the high energy electron pulse is produced just before the pinch at 40 has drawn down to its minimum diameter of ionized column. For most dimensions of the parts of the machine and values of the electrical constants in the various parts of the complete equipment, the delay in the delay line 51 should be set at zero or this delay line should be removed and the delay in delay line 50 should be set at some value less than about ten microseconds.

Figure 5:
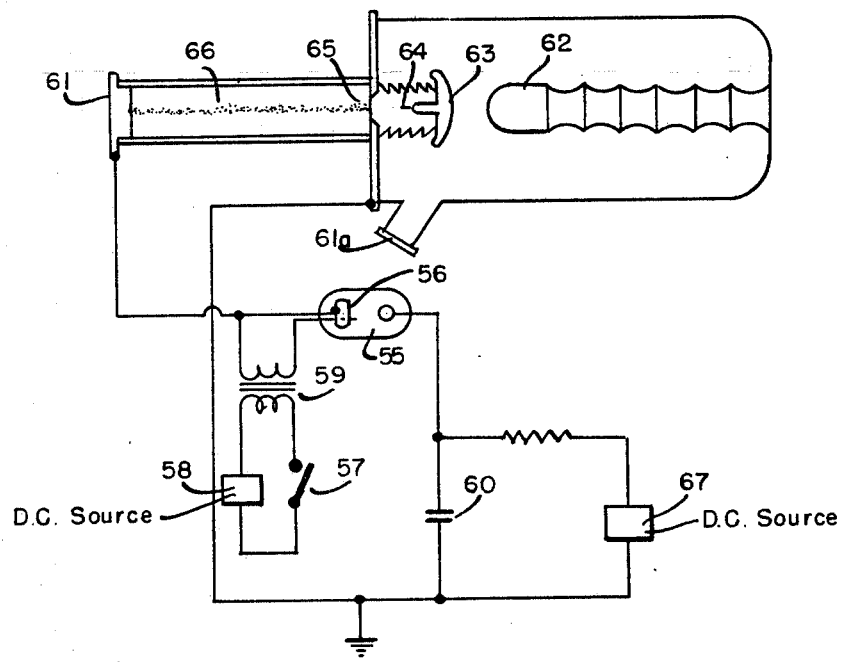
FIG. 5 illustrates another form of tube together with an electrical circuit therefor.

Another alternative form of my invention is illustrated in FIG. 5, in which high voltage is produced on a high voltage electrode, 62, by apparatus which is widely known as a Van de Graaff electrostatic generator and which is described in the Encyclopedia Brittanica, vol. 8, pp. 263–4, 1964 edition. In the triggering device 55, a pulsed high voltage is applied to the triggering electrode 56 (wire end in the middle of the hole in one electrode of a triggered gap; or the grid of a thyraton; etc.). This pulsed high voltage comes from closing the switch 57, which connects the output of the power supply 58 to the transformer 59. The firing of the triggering device connects the high voltage from the condenser 60 to the electrode 61 of the pinch tube. Firing the triggering device also produces light (both visible and ultraviolet) which passes out through the transparent wall of the device 55 and through a window 61a to fall on the high voltage terminal 62 in the high-voltage machine. This sets off a spark-over between 62, and the electrode 63 of the high-voltage machine, causing a very high intensity discharge of many high energy electrons from the field emitting cathode 64 towards the grounded electrode 65.

The pinch discharge 66, which is formed by the application of high voltage from the condenser 60 to the anode 61, focuses and guides the high voltage electron beam from the high energy machine to the target electrode 61.

Figure 6:
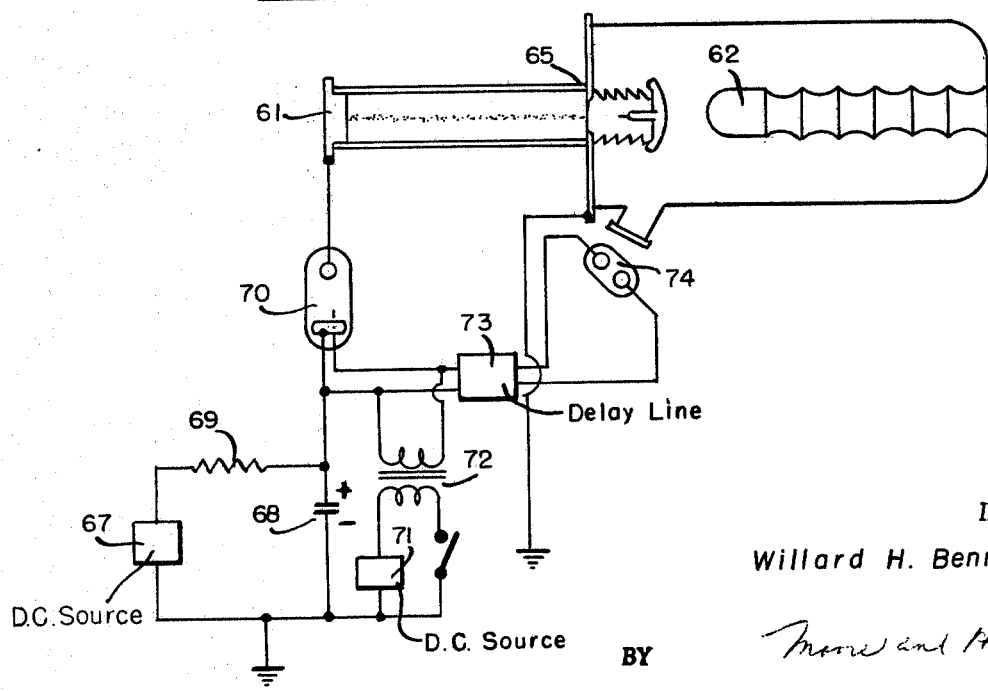
FIG. 6 illustrates another electrical circuit for the tube of FIG. 5.

A better regulated and controlled form of this apparatus is illustrated in FIG. 6. The power supply 67 charges the condenser 68 through the resistor 69. The high voltage is connected to one electrode of the triggering device. A D.C. supply 71 is connected through a primary of a transformer 72 the secondary of which is connected both to the triggering electrode of 70 as shown and also through a delay line 73 to a flash lamp 74. Light from the flash lomp falls upon either or both of the electrodes 62 and 63 and initiates a spark-over between the two electrodes.

The delay produced in the delay line 73 is adjusted so that the discharge in the high voltage machine occurs at the preferred stage of the formation of the pinch discharge between electrodes 61 and 65.

In all forms of the invention shown obove there is a thin sheet metal or foil diaphragm shown at 7 in FIG. 1, which allows the electron beam from the discharge point 6 to pass therethrough to the tube 9 of ionized gas. If desired, the diaphragm 7 may have a small hole therein to further facilitate the passage of electrons provided a vacuum pump is constantly evacuating the space around discharge point 6 (see pump 21 of FIG. 3 for example) so that the requisite low vacuum is maintained there. Any suitable prior art means may be employed to maintain the proper pressure of argon or other gas in tube 9. For example, the tube 9 may be connected by a pipe having a very small opening therethrough to a source of argon; similarly, there would be a vacuum pump connected to the tube 9 to hold the incoming argon to the desired low pressure.

The invention may be employed in any arrangement where a concentrated beam of electrons is desired. Two examples follow.

In event it is desired to employ any form of the invention in the production of X-rays, it is merely necessary for the target 8 of FIG. 1 (or the corresponding target of the other figures) to be the target of an X-ray tube.

It is well known that for certain applications welding with an electron beam is desirable. To carry out this end, the two metals to be welded together would constitute the target 8 of FIG. 1 (or the corresponding target of the other figures), and the beam would be concentrated on the joint between the two metals.

I claim to have invented:

1. Electron beam apparatus comprising beam concentrating means for producing a discharge having a self-magnetic field, means for producing an electron beam in alignment with said discharge to thereby pinch the beam, and means for actuating the last-named means to initiate the beam after said discharge has been initiated.

2. Electron beam apparatus comprising beam concentrating means for producing a pinched discharge having a self-magnetic field, and means for producing an electron beam in alignment with said pinched discharge so that the said self-magnetic field will concentrate the beam.

3. Electron beam apparatus as defined in claim 2, including means for actuating the second-named means to initiate the beam after the pinching effect begins.

4. Electron beam apparatus as defined in claim 2 in which the beam concentrating means includes a target for the beam.

5. Electron beam apparatus as defined in claim 2 in which the first-named means includes an elongated tube having a target at one end and having its other end positioned to receive the electron beam along the axis of the tube.

6. Electron beam apparatus as defined in claim 5 in which said tube is curved.

7. Electron beam apparatus as defined in claim 2 in which the first and second-named means are so constructed and arranged that the discharge forms a pinch and as the electron beam enters the pinch the electrons of the discharge move outwardly leaving an excess of positive ions over pinch electrons, which excess tends to neutralize the space charge due to the electrons of the first beam entering the pinch.

8. Electron beam apparatus as defined in claim 2 in which the second-named means comprises capacitive means for storing a high potential charge, said capacitive means having two electrodes one of which includes a discharge element which produces the electron beam in response to a spark-over between said electrodes, said first-named means comprising an elongated tube one end of which is positioned to receive the electron beam from said discharge element and the other end of which includes a target for said electron beam.

9. Electron discharge apparatus as defined in claim 8 comprising timing means for effecting discharge across said electrodes in variable timed relation with establishment of the pinched discharge.

10. Electron discharge apparatus as defined in claim 2 in which the second-named means comprises two electrodes one of which has a discharge element to establish the electron beam, the first-named means comprising an elongated tube one end of which is positioned to receive the electron beam from said discharge element, a thin diaphragm across one end of said tube, means for evacuating the space around said discharge element, said tube including a target for the electron beam at the other end of said tube, the portion of the tube between the target and the diaphragm containing an ionizable gas, and means to apply potential to said target to establish the pinched discharge.

11. Electron beam apparatus as defined in claim 2 in which the second-named means includes a discharge electrode for discharging the electron beam, and in which the first-named means comprises a tube having a diaphragm across the tube near one end thereof which end is positioned to receive the electron beam from said discharge electrode, means for evacuating the space around said discharge electrode, a target for the electron beam at the other end of said tube, said tube having an ionizable gas therein between the target and said diaphragm, means for preionizing said gas and then effecting further discharge from said target to produce the pinched discharge along the tube and then effecting discharge from said discharge electrode to produce the electron beam, thereby, to pinch the electron beam and concentrate it upon the target.

12. Electron beam apparatus as defined in claim 2 in which the second-named means comprises a light-sensitive beam generator having a pair of discharge electrodes which break down and discharge in response to light, one of said electrodes having a discharge element for discharging said second-named means, and light-producing means for feeding a pulse of energy to the first-named means to establish the pinched discharge, said light-producing means being positioned to transmit light therefrom to said light-sensitive generator to thus cause a discharge from the generator when the pinched discharge is established.

13. Electron beam apparatus as defined in claim 2 in which the first-named means includes an X-ray generating target for the electron beam.

14. Electron beam apparatus as defined in claim 2 in which the first-named means includes two metals to be welded together and which jointly comprise a target for the electron beam.

15. The method of producing a concentrated beam of electrons comprising, producing a pinched discharge having a self-magnetic field, and directing a beam of electrons into said magnetic field to thus pinch and concentrate the beam.

16. The method of claim 15 in which the beam is established no earlier than the pinched discharge.

17. The method of claim 15 in which the beam is established after the pinching effect begins.

References Cited

UNITED STATES PATENTS

| | | | |
|---|---|---|---|
| 2,970,273 | 1/1961 | Bennett | 328—237 |
| 3,270,243 | 8/1966 | Kerst | 328—228 X |
| 3,295,011 | 12/1966 | Barbini | 315—149 |
| 3,344,298 | 9/1967 | Martin | 313—57 |
| 2,362,816 | 11/1944 | Harker | 313—32 X |
| 3,099,768 | 7/1963 | Anderson | 315—5.39 |
| 3,258,576 | 6/1966 | Schleich et al. | 219—121 X |

OTHER REFERENCES

Graybill et al.: "Observations of Magnetically Self-Focusing Electron Streams," App'd Phys. Lett., vol. 8, No. 1, Jan. 1, 1966, pp. 18–20.

Williams & Co.: Electron Beam Welding, May 1963, pp. 12–15.

JAMES W. LAWRENCE, Primary Examiner

R. F. HOSSFELD, Assistant Examiner

U.S. Cl. X.R.

219—121; 328—228